United States Patent
Hadas et al.

(10) Patent No.: US 11,797,234 B2
(45) Date of Patent: Oct. 24, 2023

(54) DETERMINING A SIZE OF VIRTUAL DISKS

(71) Applicant: Red Hat, Inc., Raleigh, NC (US)

(72) Inventors: Arik Hadas, Ra'anana (IL); Daniel Erez, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 289 days.

(21) Appl. No.: 17/130,257

(22) Filed: Dec. 22, 2020

(65) Prior Publication Data

US 2022/0197569 A1    Jun. 23, 2022

(51) Int. Cl.
*G06F 3/06* (2006.01)

(52) U.S. Cl.
CPC ............ *G06F 3/0665* (2013.01); *G06F 3/064* (2013.01); *G06F 3/0604* (2013.01); *G06F 3/067* (2013.01); *G06F 3/0619* (2013.01); *G06F 3/0631* (2013.01); *G06F 3/0683* (2013.01)

(58) Field of Classification Search
CPC .... G06F 3/0665; G06F 3/0604; G06F 3/0619; G06F 3/0631; G06F 3/064; G06F 3/067; G06F 3/0683
See application file for complete search history.

(56) References Cited

U.S. PATENT DOCUMENTS

| | | | |
|---|---|---|---|
| 7,949,846 B2 | 5/2011 | Boggs et al. | |
| 8,990,815 B1 | 3/2015 | Kalekar | |
| 9,195,393 B1 | 11/2015 | Li et al. | |
| 10,365,858 B2 | 7/2019 | Miller et al. | |
| 2004/0030727 A1* | 2/2004 | Armangau | G06F 16/137 |
| 2007/0277018 A1* | 11/2007 | Tanaka | G06F 3/0605 711/171 |
| 2014/0047208 A1* | 2/2014 | Morse | G06F 3/0605 711/E12.078 |
| 2015/0106565 A1* | 4/2015 | Ayukawa | G06F 3/0665 711/114 |
| 2019/0266100 A1* | 8/2019 | Mello | G06F 12/0246 |

FOREIGN PATENT DOCUMENTS

JP    5352491    11/2013

* cited by examiner

*Primary Examiner* — Ryan Bertram
*Assistant Examiner* — Eric T Loonan
(74) *Attorney, Agent, or Firm* — K&L Gates LLP (57) ABSTRACT

A system includes a cluster of nodes including a storage domain, a memory, and a processor. The processor is configured to receive a request to determine an amount of allocated blocks associated with a virtual disk comprising a first volume. Each volume that includes metadata associated with allocated blocks is designated into a first set. Each volume within the one or more layers that lacks metadata associated with allocated blocks and includes an allocation table is designated into a second set. Each volume within the one or more layers that is omitted from the first set and second set is designated into a third set. The amount of allocated blocks within the first volume is determined based on inspecting the metadata of each volume of the first set, inspecting each allocation table of each volume of the second set, and inspecting each block of each volume in the third set.

20 Claims, 6 Drawing Sheets

DETERMINING A SIZE OF VIRTUAL DISKS

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device or multiple computing devices. Maintenance and/or modifications to installed service and/or applications may often be applied in various server or cloud environments which may be continuously evolving.

SUMMARY

The present disclosure provides new and innovative systems and methods for determining sizes of virtual disks to support virtual disk operations. In an example, a method including receiving a request to determine an amount of allocated blocks associated with a virtual disk comprising a first volume derived from one or more layers of volumes. Each volume within the one or more layers that includes metadata associated with allocated blocks is designated into a first set. Next, each volume within the one or more layers that lacks metadata associated with allocated blocks and includes an allocation table is designated into a second set. Next, each volume within the one or more layers that is omitted from the first set and second set is designated into a third set. The amount of allocated blocks within the first volume are then determined based on inspecting the metadata of each volume of the first set, inspecting each allocation table of each volume of the second set, and inspecting each block of each volume in the third set.

In an example, a system includes a cluster of nodes including a storage domain, a memory, and a processor. The storage domain includes a first volume derived from one or more layers of volumes and where the processor is in communication with the memory. The processor is configured to receive a request to determine an amount of allocated blocks associated with the first volume. Each volume within the one or more layers that includes metadata associated with allocated blocks is designated into a first set. Each volume within the one or more layers that lacks metadata associated with allocated blocks and includes an allocation table is designated into a second set. Each volume within the one or more layers that is omitted from the first set and second set is designated into a third set. Next, the amount of allocated blocks within the first volume is determined based on inspecting the metadata of each volume of the first set, inspecting each allocation table of each volume of the second set, and inspecting each block of each volume in the third set.

In an example, a non-transitory machine readable medium storing code, which when executed by a processor is configured to receive a request to determine an amount of allocated blocks associated with a virtual disk comprising a first volume derived from one or more layers of volumes. Each volume within the one or more layers that includes metadata associated with allocated blocks is designated into a first set. Each volume within the one or more layers that lacks metadata associated with allocated blocks and includes an allocation table is designated into a second set. Each volume within the one or more layers that is omitted from the first set and second set is designated into a third set. Next, the amount of allocated blocks within the first volume is determined based on inspecting the metadata of each volume of the first set, inspecting each allocation table of each volume of the second set, and inspecting each block of each volume in the third set.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Techniques are disclosed for providing an ability to determine a size of virtual disks to support disk operations. Traditionally, virtual machines (VMs) operate from virtual disks provided from physical hardware. Typically, virtual disks are multi-volume disks that are comprised of a base volume and one or more delta volumes. Generally, various operations (e.g., virtual disk migration) performed on VMs with multi-volume disks are difficult because determining a size of a total amount of collapsed data (i.e., actual allocated blocks) from a multi-volume disk is a complex process. Conventionally, while some applications (e.g., QEMU, also known as a Quick Emulator) address measuring virtual disks and/or the multi-volume disks upon which they are provisioned, their functionality often fails without metadata available for each volume within the multi-volume disk. Typically, the alternative is inspecting each and every volume to determine how many blocks are allocated within a multi-volume disk, which is often a slow processor intensive process.

As described in various examples disclosed herein, to facilitate quick and efficient disk management and/or disk operations of virtual disks, the systems and methods disclosed herein advantageously provide the capability to determine a collapsed size of a virtual disk comprised of a multi-volume disk. Determining a collapsed size of a virtual disk comprised of a multi-volume disk is performed by dividing volumes of the multi-volume disk into sets based on available information (e.g., metadata, allocation tables, and/or inspection of each block). Once each volume is placed into a set, different methods of determining allocated blocks from each volume are used based on a volume's designation. For example, a first set may include volumes with metadata, a second set may include volumes with allocation tables, and a third set may include volumes that lack metadata and an allocation table. In this example, a determination of allocated blocks may be determined by inspecting metadata in the first set, inspecting allocation tables in the second set, and inspecting each block of each volume in the third set, in priority of decreasing efficiency (e.g., inspecting metadata is more efficient than inspecting an allocation table, which is more efficient than inspecting each block of each volume). When combined, the allocated blocks from the first set, second set, and the third set equal a total amount of blocks (i.e., collapsed data) allocated within a multi-volume disk. In various implementations, adjusting methods of determining a size of a virtual disk based on available information is faster than assuming each volume includes a specific type of information or if each volume doesn't include any additional information. In various implementations, an allocation table may be generated for each volume within each virtual disk. In some implementations, allocation tables may be generated for each volume within each virtual disk as each virtual disk is allocated.

Figure 1A:
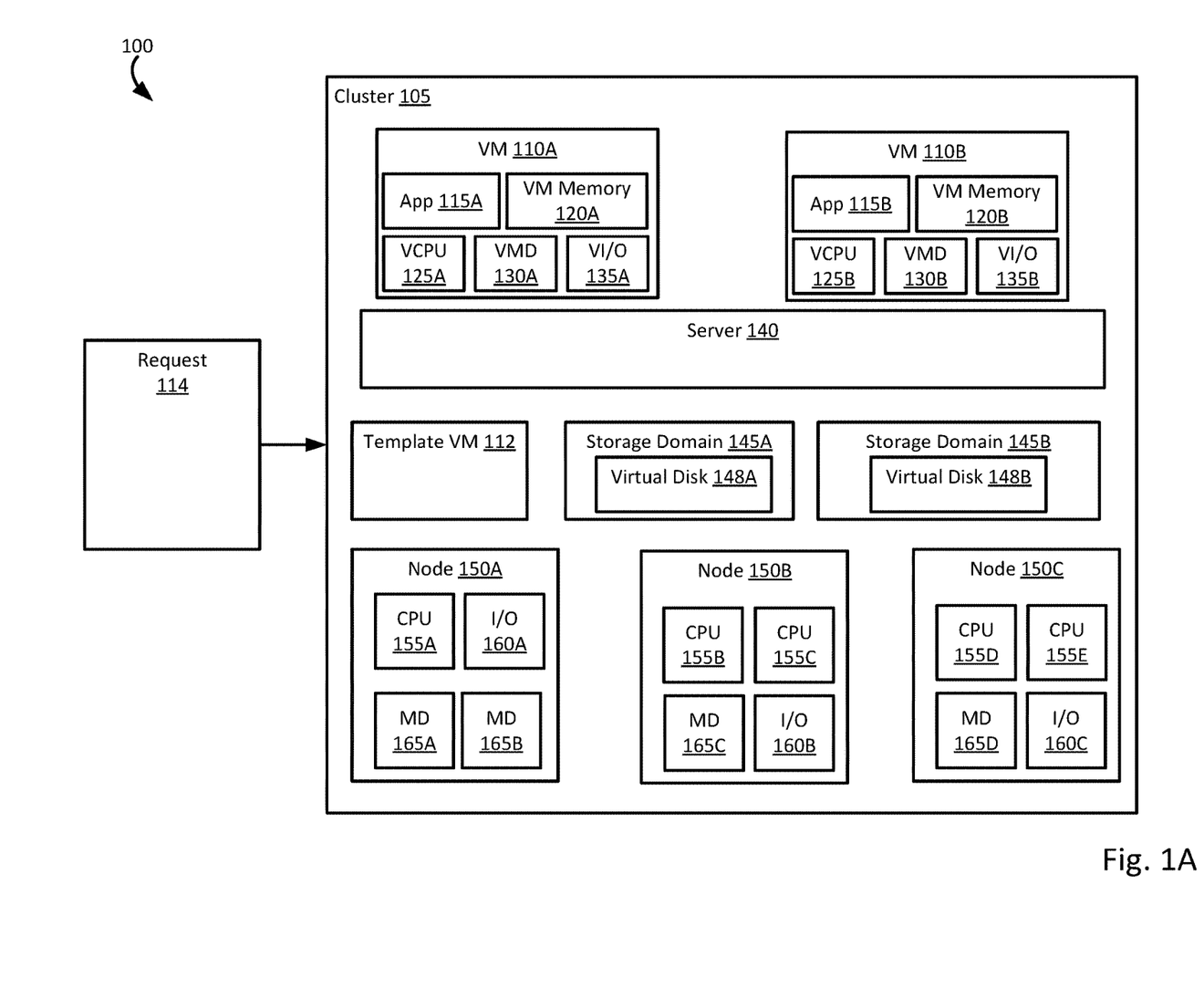
FIGS. 1A, 1B, and 1C illustrate a high level component diagram of an example computing system in accordance with one or more aspects of the disclosure.

FIG. 1A depicts a high-level component diagram of an example computing system 100 in accordance with one or more aspects of the present disclosure. The computing system 100 may include a cluster 105, which may include a server 140, one or more virtual machines (VM 110A-B, 110 generally), and nodes (e.g., nodes 150A-C, 150 generally). The cluster 105 may include storage domains (e.g., 145A-B, 145 generally), which may be hosted from any of nodes 150 and/or server 140. Each storage domain 145 may include one or more virtual disks (e.g., virtual disk (148A-B, 148 generally)), which may include one or more volumes. A computing system 100 may be operable to use a template VM 112 to generate and/or create VMs 110 having virtual disk 148A provided by a storage domain 145A. In various implementations, a cluster 105 may receive requests 114 to generate new VMs associated with a virtual disk 148 comprising a multi-volume disks from a storage domain 145.

Virtual machines 110A-B may include a virtual machine memory (VM Memory), a virtual CPU (VCPU), virtual memory devices (VMD), and virtual input/output devices (VI/O). For example, virtual machine 110A may include virtual machine memory 120A, a virtual CPU 125A, a virtual memory devices 130A, and a virtual input/output device 135A. Similarly, virtual machine 110B may include virtual machine memory 120B, a virtual CPU 125B, a virtual memory devices 130B, and virtual input/output device 135B. In an example, Applications 115A-B may be different applications or services. In another example, applications 115A-B may be different instances of the same application or service. In an example, virtual memory devices (e.g., VMD 130A-B) may be a virtual disk (e.g., virtual disk 148) provided from a storage domain (e.g., storage domain 145). In another example, a virtual disk (e.g., virtual disks 148A-B) may be comprised of a single volume and/or a multi-volume disk. In yet another example, a virtual disk (e.g., virtual disks 148A-B) may be provisioned from the server 140, nodes 150, and/or other available external physical storage (e.g., a data storage device, cloud storage provider, etc.).

In an example, a virtual machine 110A may execute a guest operating system and run applications 115A which may utilize the underlying VCPU 125A, VMD 130A, and VI/O device 135A. One or more applications 115A may be running on a virtual machine 110A under the respective guest operating system. A virtual machine (e.g., VM 110A-B, as illustrated in FIG. 1) may run on any type of dependent, independent, compatible, and/or incompatible applications on the underlying hardware and operating system ("OS"). In an example, applications (e.g., App 115A) run on a virtual machine 110A may be dependent on the underlying hardware and/or OS. In another example embodiment, applications (e.g., Application 115A) run on a virtual machine 110A may be independent of the underlying hardware and/or OS. For example, application 115A run on a first virtual machine 115A may be dependent on the underlying hardware and/or OS while other applications (e.g., application 115B) run on a second virtual machine (e.g., VM 110B) may be independent of the underlying hardware and/or OS. Additionally, applications (e.g., application 115A) run on a virtual machine 110A may be compatible with the underlying hardware and/or OS. In an example embodiment, application 115A run on a virtual machine 110A may be incompatible with the underlying hardware and/or OS. For example, application 115A run on one virtual machine 110A may be compatible with the underlying hardware and/or OS while applications 115B run on another virtual machine 110B is incompatible with the underlying hardware and/or OS.

In an example, virtual machines 110A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 115A-B or services (e.g., microservices) may run in a software container or a virtual machine (e.g., virtual machines 110A-B).

The computer system 100 may include one or more nodes 150A-C. Each node 150A-C may in turn include one or more physical processors (e.g., CPU 155A-E) communicatively coupled to memory devices (e.g., MD 165A-D) and input/output devices (e.g., I/O 160A-C). Each node 150A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 110A-B may be provisioned on the same host or node (e.g., node 150A) or different nodes. For example, VM 110A and VM 110B may both be provisioned on node 150A. Alternatively, VM 110A may be provisioned on node 150A while VM 110B is provisioned on node 150B.

As used herein, physical processor or processor 155A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 165A-D refers to a volatile or non-volatile memory device, such as RAM, ROM, EEPROM, or any other device capable of storing data. As discussed herein, I/O device 160A-C refers to a device capable of providing an interface between one or more processor pins and an external device capable of inputting and/or outputting binary data.

Processors (e.g., CPUs 155A-E) may be interconnected using a variety of techniques, ranging from a point-to-point processor interconnect, to a system area network, such as an Ethernet-based network. Local connections within each node, including the connections between a processor 155A-E and a memory device 165A-D may be provided by one or more local buses of suitable architecture, for example, peripheral component interconnect (PCI).

Figure 1B:
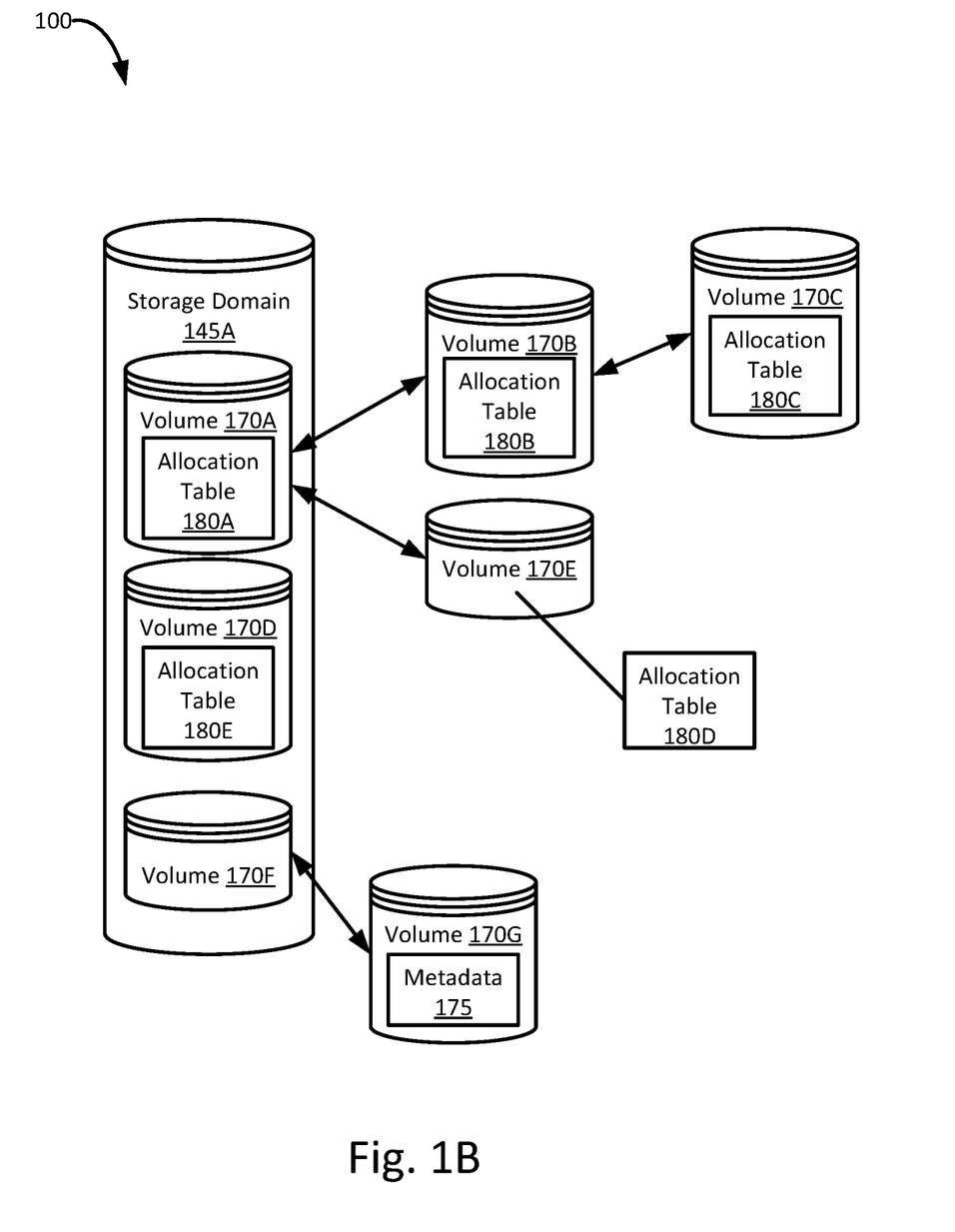

FIG. 1B illustrates a high-level diagram of example virtual disks within a multi-volume disk in accordance with one or more aspects of the disclosure. As shown in FIG. 1B, computing system 100 includes a storage domain 145A which includes a plurality of virtual disks. Each virtual disk may include single volume or multiple volumes. For example, as shown in FIG. 1B, each virtual disk includes one or more layers of volumes (e.g., volumes 170A-G). In one example, a first virtual disk may include volume 170A, volume 170B, and volume 170C. In this example, each of the volumes (i.e., volumes 170A, 170B, and 170C) each include an allocation table (i.e., allocation tables 180A, 180B, and 180C) which indicate which blocks within each respective volume (i.e., volumes 170A, 170B, and 170C) are currently allocated. In various implementations, a block may be a specific quantity of data storage (e.g., a block may be 4 KB of storage). In other implementations, each computing system may have a different block size (e.g., a first system may have a block size of 256 KB and a second system may have a block size of 512 KB). As shown, volume 170A is a base volume, volume 170B is a delta volume from volume 170A (i.e., a volume that contains the differences when compared to volume 170A), and volume 170C is a delta volume from volume 170B (i.e., a volume that contains differences when compared to volume 170B). In an alternate example, a second virtual disk may include volume 170D. In this example, volume 170D includes allocation table 180E which indicates allocated and/or unallocated blocks within the volume 170D. In this instance, the allocation table 180E may be inspected to determine which blocks of the volume 170D are allocated. In various implementations, inspecting may include reading and/or retrieving data (e.g., metadata, an entry within an allocation table, and/or data stored in the block itself) associated with each block of a volume. For example, inspecting metadata includes retrieving and/or reading metadata associated with a volume to determine whether blocks within the volume are allocated. In another example, inspecting an allocation table includes retrieving and/or reading one or more entries within an allocation table to determine if blocks associated with each entry is allocated. In a further example, inspecting data stored within a volume includes reading a block within the volume and determining if the block includes stored data. In yet another example, a third virtual disk may include volumes 170F and 170G. In this example, volume 170F lacks both metadata and an allocation table and volume 170G is associated with metadata 175. In this instance, volume 170F may be inspected to determine which blocks of the volume 170F are allocated while metadata 175 may be inspected to determine which blocks are allocated from volume 170G. In yet another example, a forth virtual disk may include volume 170A and volume 170E. In this example, volume 170E includes an allocation table 180D that is stored external to the volume 170E. In various implementations, an allocation table may be located within a volume. In other implementations, an allocation table may be centrally located within a computing system (e.g., a server 140). In some implementations, an allocation table may be placed in various locations within a computing system (e.g., a server 140, a cluster 105, Nodes 150, VMs 110, and/or other virtual disks 148).

Figure 1C:
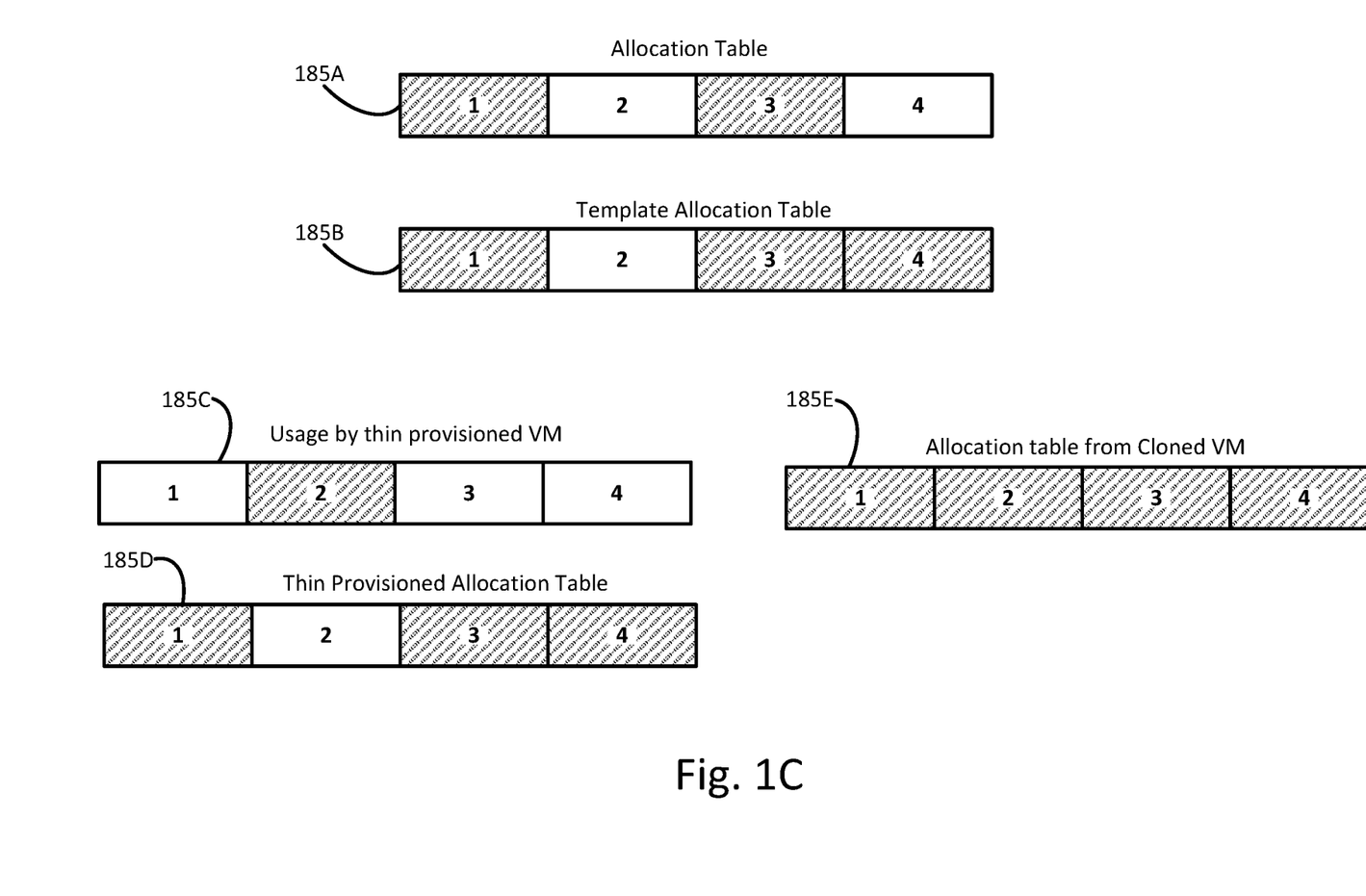

FIG. 1C illustrates a high-level diagram of example allocation tables associated with virtual disks, in accordance with one or more aspects of the disclosure. As shown in FIG. 1C, each allocation table includes an entry for each block within a given volume to reflect whether a block is allocated or unallocated. Each entry within an allocation table may be set when a block is allocated and/or deallocated (e.g., an entry may be set to true or false, 1 or 0, and/or other binary values). For example, allocation table 185A is associated with a virtual disk where block 1 and block 3 of the virtual disk are allocated. In various implementations, a computing system 100 (shown in FIG. 1) is operable to create a template VM (e.g., template VM 112) with a template virtual disk and associated template allocation table (e.g., template allocation table 185B) based on an existing VM, virtual disk, and associated allocation table. For example, a computing system 100 may create a template VM 112 based on an existing VM (e.g., VM 110A), where the template allocation table 185B is based off an allocation table (e.g., allocation table 185A) associated with the base VM (e.g., VM 110A).

The computing system 100 is operable to clone a VM or thin provision a VM. For example, a cluster 105 may receive a request 114 to create a cloned VM (e.g., a VM may be cloned when speed of a VM is more important than an amount of storage used by the VM). In response, the cluster 105 may generate a cloned VM (e.g., VM 110B) based on template VM 112, where the cloned VM includes a virtual disk (e.g., virtual disk 148A) copied from a parent VM (e.g., VM 110A) and an associated allocation table 185E. In this instance, any writes (e.g., block 2 in allocation table 185E) by the cloned VM are reflected in the allocation table 185E. In another example, a cluster 105 may receive a request 114 to create a thin provisioned VM (e.g., a VM may be thin provisioned when conserving data storage space is more important that a speed of the VM). In response to the request 114, the cluster 105 may generate a thin provisioned VM (e.g., VM 110B) based on template VM 112, where an associated virtual disk is thin provisioned and based on an existing virtual disk (e.g., virtual disk 145B). In various implementations, writes made by the thin provisioned VM may be written a "latest" volume within a multi-volume virtual disk. For example, a virtual disk 148 may be comprised of volumes 170A, 170B, and 170C (FIG. 1B). In this example, writes may be sent to volume 170C, which is the latest volume within the multi-volume virtual disk 148. In this instance, allocation table 180A, 180B, and 180C would only be updated if volumes 170A, 170B, and 170C are updated respectively.

Figure 2:
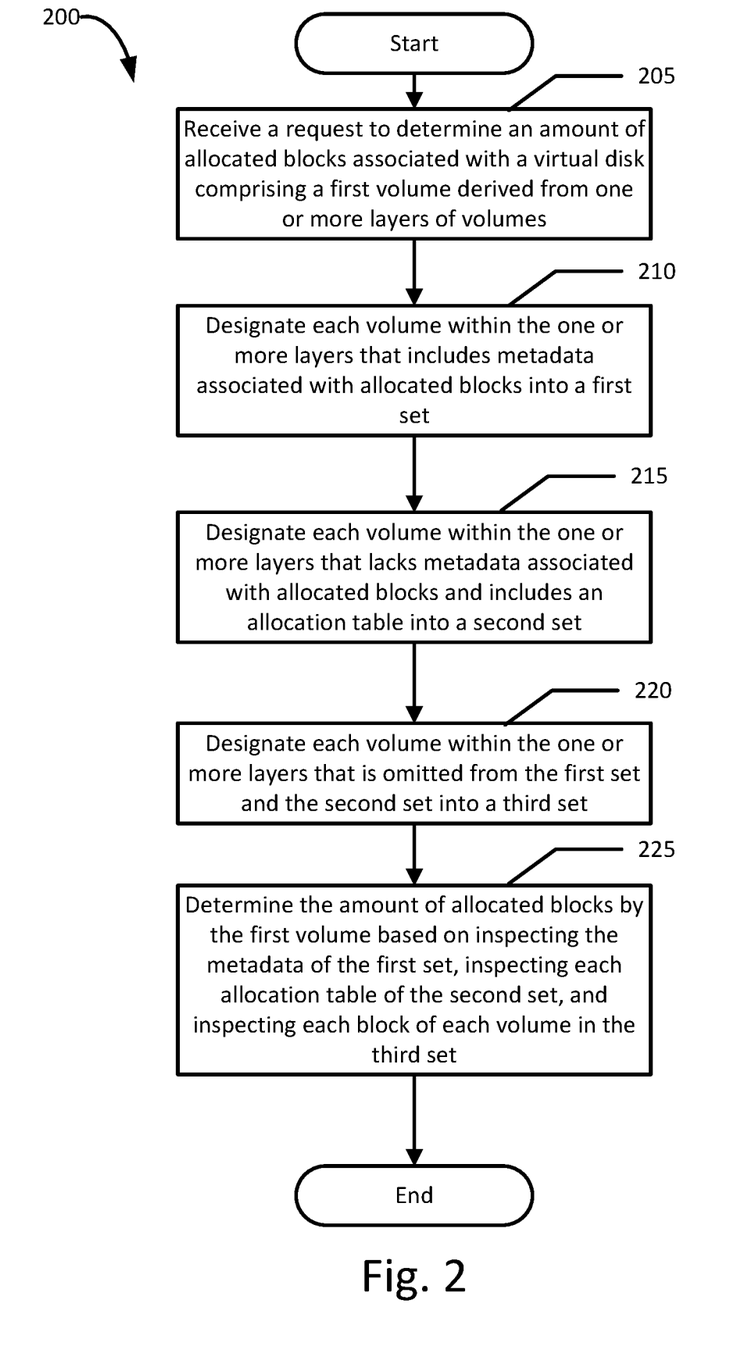
FIG. 2 illustrates a flowchart of an example method of determining a size of a virtual disk comprised of a multi-volume disk in accordance with one or more aspects of the disclosure.

FIG. 2 illustrates a flowchart of an example method of determining a collapsed size of a virtual disk, in accordance with an embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated and some of the blocks described are optional. The method 200 may be performed by processing logic that may comprise hardware (circuitry, dedicated logic, etc.), software, or a combination of both.

As shown in FIG. 2, an example method 200 may begin with receiving a request to determine an amount of allocated blocks associated with a virtual disk comprising a first volume derived from one or more layers of volumes (block 205). For example, a cluster 105 may have been updated with increased storage (e.g., storage within a node 150 or additional virtual disks 148) and a request 114 is received to migrate VMs to load balance data storage usage across the cluster 105. In this example, the cluster 105 may initiate analysis of the storage domain 145 to determine which virtual disks 148 to migrate to other storage domains 145 and/or virtual disks 148. In various implementations, an amount of blocks is a quantity of blocks and/or an aggregated size of blocks. Next, the example method 200 may include designating each volume within the one or more layers that includes metadata associated with allocated blocks into a first set (block 210). For example, a virtual disk 148A (FIG. 1A) is comprised of one or more layers of volumes (e.g., a virtual disk may be comprised of volumes 170A, 170B, and 170C). In this example, each volume (e.g., volumes 170A, 170B, and 170C) is checked, designated, and/or placed into a first set if each volume includes metadata. In this example, none of the volumes 170A, 170B, nor 170C includes metadata and therefore are not included in the first set.

Next, the example method 200 may include designating each volume within the one or more layers that lacks metadata associated with the allocated blocks and includes an allocation table into a second set (block 215). For example, a virtual disk 148 (FIG. 1A) is comprised of one or more layers of volumes (e.g., a virtual disk may be comprised of volumes 170A, 170B, and 170C). In this example, each of the volumes (i.e., volumes 170A, 170B, and 170C) each include an allocation table (i.e., allocation tables 180A, 180B, and 180C) and are therefore included in the second set. Next, the example method 200 may include designating each volume within the one or more layers that is omitted from the first set and the second set into a third set (block 220). For example, a virtual disk 148 (FIG. 1A) comprised of one or more layers of volumes (e.g., a virtual disk may be comprised of volumes 170A, 170B, and 170C) would not have any volumes available for the third set because each of the volumes (e.g., volumes 170A, 170B, and 170C) would be designated and/or placed into the second set. Next, the example method 200 may include determining the amount of allocated blocks by the first volume based on inspecting the metadata of the first set, inspecting each allocation table of the second set, and inspecting each block of each volume in the third set (block 225). For example, for a virtual disk that includes volumes 170A, 170B, and 170C, each of the volumes are designated and/or placed into the second set, indicating that each associated allocation table 180A, 180B, and 180C is inspected to determine a total amount of allocated blocks associated with the virtual disk. In an alternate example, for a virtual disk that includes volume 170F and 170G, volume 170F is designated and/or placed into a third set and volume 170G is designated and/or placed into a first set. In this example, determining a total amount of allocated blocks associated with the virtual disk includes inspecting the metadata of volume 170G and inspecting each block of volume 170F.

Figure 3:
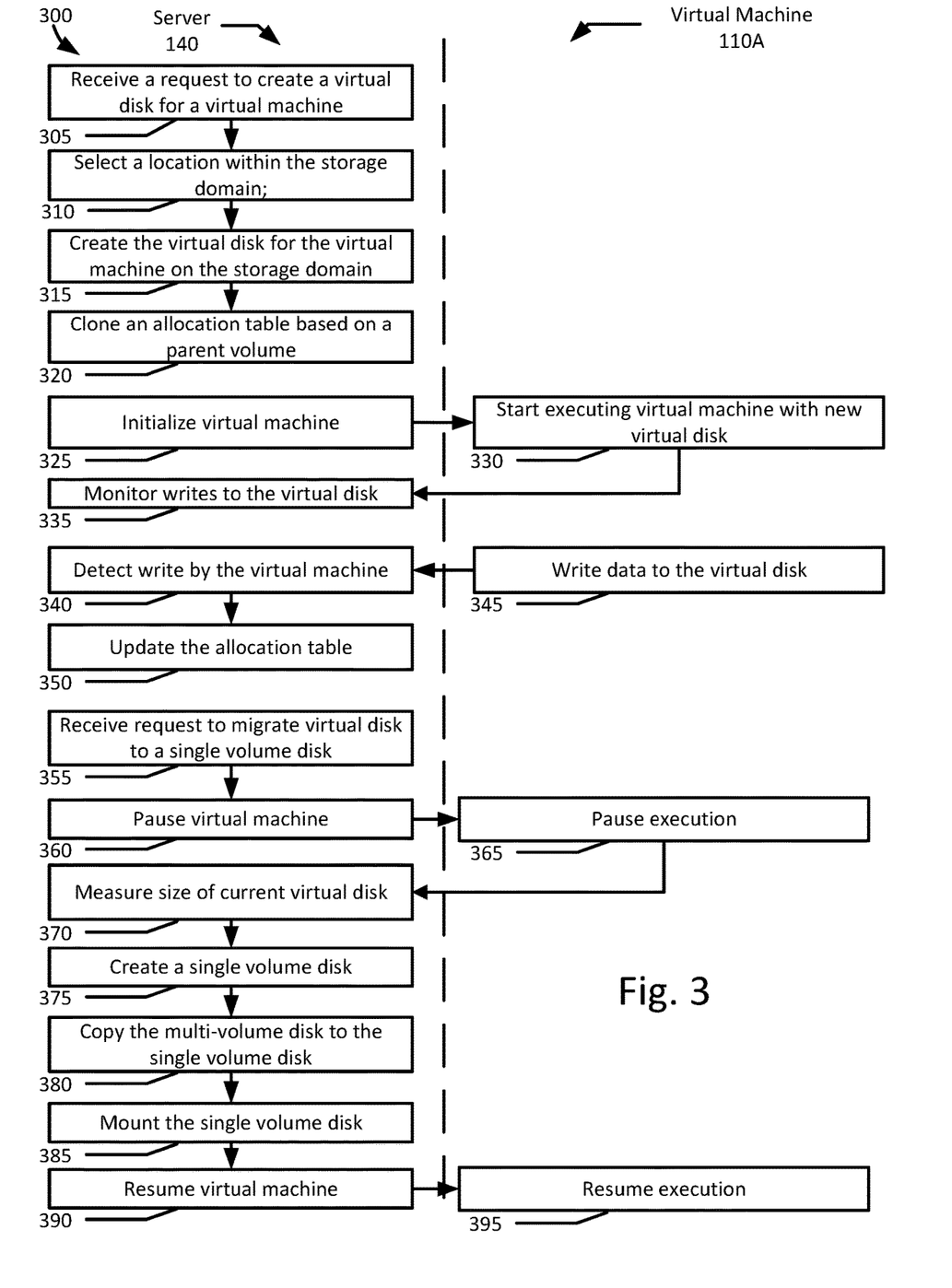
FIG. 3 illustrates a flow diagram of example methods of modifying a virtual disk in accordance with one or more embodiments of the disclosure.

FIG. 3 illustrates a flow diagram of an example methods of performing disk operations on a virtual disk associated with a virtual machine, in accordance with an embodiment of the present disclosure. Although the example method 300 is described with reference to the flow diagram illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. For example, in the illustrated flow diagram, a server 140 creates a virtual machine 110A and performs disk operations on the virtual disk 148 associated with the virtual machine 110A.

As shown in FIG. 3, server 140 receives a request 114 to create a virtual disk 148A for a virtual machine 110A (block 305). For example, a server 140 may receive a request to create a VM (e.g., VM 110A) for use as a workstation. The server 140 selects a location within a storage domain 145A to place the virtual disk 148A (block 310) and creates a virtual disk 148A for the VM 110A on the storage domain 145A (block 315). Next, the server 140 clones an allocation table (e.g., template allocation table 185B) based on a parent volume (block 320). Once created, the server 140 initializes virtual machine 110A (block 325). The virtual machine 110A starts executing with the new virtual disk 148A (block 330). While the virtual machine 110A is operating, the server 140 monitors writes to the virtual disk 148A. During operation, the virtual machine 110A reads from and writes to the virtual disk 148A (block 345). When the server 140 detects a write by the virtual machine 110A (block 340), the server 140 updates the allocation table (e.g., allocation table 185E) (block 350). For example, a VM 110A is associated with a virtual disk 148A with allocation table 185A. The VM 110A may write to block 2 on the virtual disk 148A. Once a write is detected, the server 140 updates the allocation table 185A with an indication that block 2 is allocated. In various implementations, an allocation table may be updated by a server 140, a cluster 105, a process, service, and/or application executing within the cluster.

As shown in FIG. 3, a server 140 may receive a request 114 to migrate a virtual disk 148A to a single volume disk (block 380). For example, a server 140 may be directed to migrate a virtual disk to balance data storage usage across a cluster. Next, server 140 is operable to pause a virtual machine 110A (block 360) to perform virtual disk operations. Once a virtual machine 110A is paused (block 365), the server 140 determines a size of the current virtual disk 148A (block 370). For example, if a virtual disk (e.g., virtual disk 148A) is comprised of volumes 170F and 170G (FIG. 1B), the server 140 is operable to designate and/or place each of the volumes (i.e., volumes 170F and 170G) into one of a first, second, or a third set. In this example, volume 170F lacking both metadata and an allocation table is placed in a third set and volume 170G including metadata is placed in a first set. In this instance, the metadata 175 is inspected to determine how many blocks are allocated within volume 170G and each block within volume 170F is inspected to determine how many blocks are allocated within volume 170F.

Next, the server 140 creates a single volume disk (e.g., volume 170D) (block 375) and copies data from the virtual disk 148A to the single volume disk (block 380). Next, the server 140 mounts the single volume disk to the VM 110A (block 385) and restarts and/or resumes the virtual machine 110A (block 390). Subsequently, the virtual machine 110A restarts and/or resumes execution (block 395). In various implementations, a server 140 may create a snapshot of a virtual machine 110A and determine an amount of allocated blocks within each volume of a virtual disk 148A from the snapshot of the virtual machine 110A. In some implementations, allocation table may include blocks with an unknown state. In these implementations, when determining an amount of allocated blocks of a virtual disk associated with the allocation table, blocks associated with unknown entries may be inspected to determine whether the blocks are allocated. In certain implementations, allocation table entries designated as unknown may be directed to count each unknown entry as an allocated block.

Figure 4:
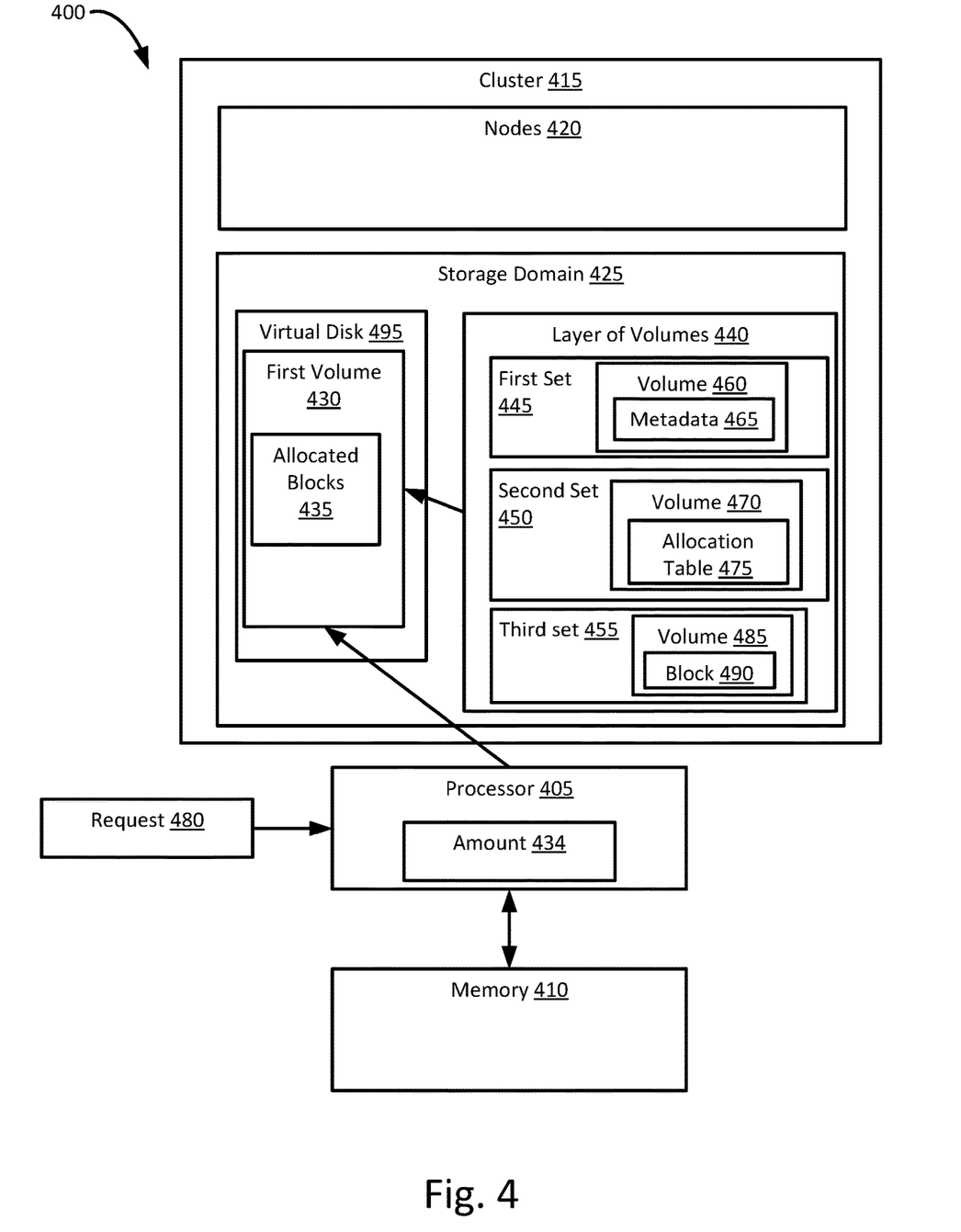
FIG. 4 illustrates a block diagram of an example system determining a size of a virtual disk in accordance with one or more embodiments of the disclosure.

FIG. 4 is a block diagram of system 400 which includes a cluster 415 of nodes 420, a memory 410, and a processor 415. The cluster 415 of nodes 420 includes a storage domain 425, where the storage domain 425 includes a first volume 430 derived from one or more layers of volumes 440. The processor 405 is in communication with the memory 410 and the processor 405 is configured to receive a request 480 to determine an amount 434 of allocated blocks 435 associated with a virtual disk 495 comprising the first volume 430. Each volume 460 within the one or more layers 440 that includes metadata 465 associated with allocated blocks 435 is designated into a first set 445. Each volume 470 within the one or more layers 440 that lacks metadata 465 associated with allocated blocks 435 and includes an allocation table 475 is designated into a second set 450. Each volume 485 within the one or more layers 440 that is omitted from the first set 445 and the second set 450 is designated into a third set 455. The amount 434 of allocated blocks 435 within the first volume 430 is determined based on inspecting the metadata 465 of each volume 460 of the first set 445, inspecting each allocation table 475 of each volume 470 of the second set 450, and inspecting each block 490 of each volume 485 in the third set 455.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
a cluster of nodes including a storage domain, wherein the storage domain includes a first volume derived from one or more layers of volumes;
a memory; and
a processor in communication with the memory, wherein the processor is configured to:
receive a request to migrate one or more virtual disks to a single-volume disk; and
responsive to receiving the request to migrate,
determine an amount of allocated blocks associated with the one or more virtual disks comprising the first volume,
designate each volume within the one or more layers that includes metadata outside of an allocation table associated with allocated blocks into a first set,
designate each volume within the one or more layers that lacks metadata associated with allocated blocks is omitted from the first set and includes a respective allocation table into a second set,
designate each volume within the one or more layers that is omitted from the first set and second set into a third set,
determine the amount of allocated blocks within the first volume based on inspecting the metadata of each volume of the first set, inspecting each allocation table of each volume of the second set, and inspecting each block of each volume in the third set,
create the single-volume disk, and
migrate data from the one or more virtual disks to the single-volume disk.

2. The system of claim 1, wherein the processor is further configured to:
receive a request to create a cloned volume for a virtual machine;
create the first volume for the virtual machine;
clone a template allocation table from a parent volume to create a virtual disk allocation table;
designate unallocated entries within the virtual disk allocation table as unknown, wherein entries designated as unknown have not been written to by the virtual machine.

3. The system of claim 2, wherein the determining of the amount of allocated blocks within the first volume comprises:
pausing execution of the virtual machine before determining the amount of allocated blocks within the first volume; and
after determining the amount of allocated blocks within the first volume, resuming execution of the virtual machine.

4. The system of claim 2, wherein the determining the amount of allocated blocks within the first volume comprises:
creating a snapshot of the virtual machine; and
determining the amount of allocated blocks within a first volume by determining an amount of allocated blocks within the snapshot of the virtual machine.

5. The system of claim 2, wherein the processor is further configured to:
responsive to the virtual machine writing to a block associated with a first entry set to unknown within the virtual disk allocation table, set the first entry to allocated.

6. The system of claim 1, wherein the processor is further configured to:
receive a request to create a cloned volume;
create the first volume;
clone a template allocation table from a parent volume to create an allocation table associated with the first volume;

designate unallocated entries within the allocation table associated with the first volume as unknown, wherein entries designated as unknown have not been modified.

7. The system of claim 1, wherein entries within each allocation table designated as unknown are inspected to determine whether each block associated with each unknown entry is allocated.

8. The system of claim 1, wherein entries designated as unknown within each allocation table are counted as allocated.

9. The system of claim 1, wherein the processor is further configured to:
create a second volume sized to contain the amount of allocated blocks; and
copy data from the first volume, including each of the one or more layers of volumes, to the second volume.

10. A method, comprising:
receiving a request to migrate one or more virtual disks to a single-volume disk; and
responsive to receiving the request to migrate,
determining an amount of allocated blocks associated with the one or more virtual disks comprising a first volume derived from one or more layers of volumes,
designating each volume within the one or more layers that includes metadata outside of an allocation table associated with allocated blocks into a first set,
designating each volume within the one or more layers that lacks metadata associated with allocated blocks is omitted from the first set and includes a respective allocation table into a second set,
designating each volume within the one or more layers that is omitted from the first set and second set into a third set,
determining the amount of allocated blocks within the first volume based on inspecting the metadata of each volume of the first set, inspecting each allocation table of each volume of the second set, and inspecting each block of each volume in the third set,
creating the single-volume disk, and
migrating data from the one or more virtual disks to the single-volume disk.

11. The method of claim 10, further comprising:
receiving a request to create a cloned volume for the virtual machine;
creating the first volume for the virtual machine;
cloning a template allocation table from a parent volume to create a virtual machine allocation table;
designating unallocated entries within the virtual machine allocation table as unknown, wherein entries designated as unknown have not been written to by the virtual machine.

12. The method of claim 11, wherein the determining of the amount of allocated blocks within the first volume comprises:
pausing execution of the virtual machine before determining the amount of allocated blocks within the first volume; and
after determining the amount of allocated blocks within the first volume, resuming execution of the virtual machine.

13. The method of claim 11, wherein the determining the amount of allocated blocks within the first volume comprises:
creating a snapshot of the virtual machine; and
determining the amount of allocated blocks within first volume by determining an amount of allocated blocks within the snapshot of the virtual machine.

14. The method of claim 11, further comprising:
responsive to the virtual machine writing to a block associated with a first entry set to unknown within the virtual machine allocation table, setting the first entry to allocated.

15. The method of claim 10, further comprising:
receiving a request to create a cloned volume;
creating the first volume;
cloning a template allocation table from a parent volume to create an allocation table associated with the first volume;
designating unallocated entries within the allocation table associated with the first volume as unknown, wherein entries designated as unknown have not been modified.

16. The method of claim 10, wherein entries within each allocation table designated as unknown are inspected to determine whether each block associated with each unknown entry is allocated.

17. The method of claim 10, wherein entries designated as unknown within each allocation table are counted as allocated.

18. The method of claim 10, further comprising:
creating a second volume sized to contain the amount of allocated blocks; and
copying data from the first volume, including each of the one or more layers of volumes, to the second volume.

19. A non-transitory machine readable medium storing code, which when executed by a processor is configured to:
receive a request to migrate one or more virtual disks to a single-volume disk; and
responsive to receiving the request to migrate,
determine an amount of allocated blocks associated with the one or more virtual disks comprising a first volume derived from one or more layers of volumes,
designate each volume within the one or more layers that includes metadata outside of an allocation table associated with allocated blocks into a first set,
designate each volume within the one or more layers that lacks metadata associated with allocated blocks is omitted from the first set and includes a respective allocation table into a second set,
designate each volume within the one or more layers that is omitted from the first set and second set into a third set,
determine the amount of allocated blocks within the first volume based on inspecting the metadata of each volume of the first set, inspecting each allocation table of each volume of the second set, and inspecting each block of each volume in the third set,
create the single-volume disk, and
migrate data from the one or more virtual disks to the single-volume disk.

20. The non-transitory machine readable medium of claim 19, wherein the code, when executed by a processor, is further configured to:
receive a request to create a cloned volume for a virtual machine;
create the first volume for the virtual machine;
clone a template allocation table from a parent volume to create a virtual machine allocation table;
designate unallocated entries within the virtual machine allocation table as unknown, wherein entries designated as unknown have not been written to by the virtual machine.

* * * * *